(12) United States Patent
Kaspar et al.

(10) Patent No.: US 9,029,477 B2
(45) Date of Patent: May 12, 2015

(54) COMPOSITIONS COMPRISING MELT-PROCESSABLE THERMOPLASTIC FLUOROPOLYMERS AND METHODS OF MAKING THE SAME

(75) Inventors: Harald Kaspar, Gendorf (DE); Klaus Hintzer, Burgkirchen (DE)

(73) Assignee: 3M Innovative Properties Company, Saint Paul, MN (US)

( * ) Notice: Subject to any disclaimer, the term of this patent is extended or adjusted under 35 U.S.C. 154(b) by 779 days.

(21) Appl. No.: 11/276,520

(22) Filed: Mar. 3, 2006

(65) Prior Publication Data

US 2007/0208137 A1    Sep. 6, 2007

(51) Int. Cl.
 C08L 27/12  (2006.01)
 C08L 27/16  (2006.01)
 C08L 27/18  (2006.01)
 C08L 27/20  (2006.01)
 C08L 27/10  (2006.01)

(52) U.S. Cl.
 CPC ............ *C08L 27/16* (2013.01); *C08L 27/18* (2013.01); *C08L 27/20* (2013.01); *C08L 27/10* (2013.01); *C08L 27/12* (2013.01); *C08L 2205/02* (2013.01)

(58) Field of Classification Search
 CPC .................... C08L 27/16; C08L 2205/02
 USPC ............... 525/199, 200, 213, 214, 215
 See application file for complete search history.

(56) References Cited

U.S. PATENT DOCUMENTS

| | | | |
|---|---|---|---|
| 3,505,416 A | | 4/1970 | Davis et al. |
| 3,969,435 A | | 7/1976 | Bailey et al. |
| 4,612,357 A | | 9/1986 | Bekiarian et al. |
| 5,015,693 A | * | 5/1991 | Duchesne et al. ............ 525/187 |
| 5,703,185 A | | 12/1997 | Blair |
| 5,710,217 A | * | 1/1998 | Blong et al. ................ 525/199 |
| 6,242,548 B1 | | 6/2001 | Duchesne et al. |
| 6,310,141 B1 | * | 10/2001 | Chen et al. .................. 525/199 |
| 6,391,998 B1 | * | 5/2002 | Garcia-Franco et al. ..... 526/348 |
| 6,583,226 B1 | * | 6/2003 | Kaulbach et al. ............ 525/199 |
| 6,610,807 B2 | | 8/2003 | Duchesne et al. |
| 6,743,508 B2 | * | 6/2004 | Kono et al. .................. 428/402 |
| 6,822,050 B2 | * | 11/2004 | Albano et al. ............... 525/199 |
| 6,927,265 B2 | * | 8/2005 | Kaspar et al. ............... 526/249 |
| 2003/0004273 A1 | * | 1/2003 | Apostolo et al. ............ 525/199 |
| 2003/0013813 A1 | * | 1/2003 | Ellul et al. .................. 525/191 |
| 2003/0060568 A1 | * | 3/2003 | Albano et al. ............... 525/199 |
| 2003/0195314 A1 | * | 10/2003 | Buckanin et al. ............ 526/247 |
| 2004/0014900 A1 | * | 1/2004 | Coggio et al. ............ 525/326.2 |
| 2004/0082741 A1 | * | 4/2004 | Lai et al. .................... 526/126 |
| 2004/0192868 A1 | * | 9/2004 | Kaspar et al. ............... 526/249 |
| 2004/0260022 A1 | * | 12/2004 | Amos et al. ................. 525/123 |
| 2005/0143494 A1 | * | 6/2005 | Jones ......................... 523/201 |
| 2005/0261431 A1 | * | 11/2005 | Takahashi et al. ........... 525/192 |
| 2006/0122333 A1 | * | 6/2006 | Nishio ........................ 525/199 |

FOREIGN PATENT DOCUMENTS

| | | |
|---|---|---|
| EP | 0 075 312 A2 | 3/1983 |
| EP | 0 088 414 A2 | 9/1983 |
| EP | 0 208 305 A2 | 1/1987 |
| EP | 0 362 868 A2 | 4/1990 |
| EP | 1 189 953 B1 | 3/2002 |
| JP | 2002-037965 | 2/2002 |
| WO | WO 2004111124 A2 | 12/2004 |

OTHER PUBLICATIONS

Chemical Abstracts, 1970, vol. 73, No. 1, p. 24.
Wood-Adams et al., "Effect of Molecular Structure on Linear Viscoelastic Behavior of Polyethylene", Macromolecules, 2000, vol. 33, pp. 7489-7499.
Münstedt, "New Universal Extension Rheometer for Polymer Melts. Measurements on a Polystyrene Sample", 1979, Journal of Rheology, vol. 23, Issue 4, pp. 421-436.
Laun et al., "Elongational behaviour of a low density polyethylene melt I. Strain rate and stress dependence of viscosity and recoverable strain in the steady-state. Comparison with shear data. Influence of interfacial tension.", Rheologica Acta, 1978, vol. 17, No. 4, pp. 415-425.
Garcia-Franco et al., "Similarities between Gelation and Long Chain Branching Viscoelastic Behavior", Macromolecules, May 8, 2001, vol. 34, No. 10, pp. 3115-3117.
Auhl et al., "Molecular Characterization of Semi-Fluorinated Copolymers with a Controlled Amount of Long-Chain Branching", Macromolecules, 2006, vol. 39, pp. 2316-2324.
Trinkle et al., "Van Gurp-Palmen-plot: a way to characterize polydispersity of linear polymers", Rheol Acta, 2001, vol. 40, pp. 322-328.
Kulkarni et al., "Quantification of Branching in Disordered Materials", Journal of Polymer Science: Part B: Polymer Physics, 2006, vol. 44, pp. 1395-1405.
Oriani, Steven R. et al., "Particle Size: The Revolution in Fluoropolymer Process Aids" Polymers, Laminations, Adhesives, Coatings and Extrusions (PLACE), Sep. 17-21, 2006, p. 1, (available at http://www.tappi.org/content/enewsletters/eplace/2007/06PLA02.pdf).

* cited by examiner

*Primary Examiner* — Irina Krylova
(74) *Attorney, Agent, or Firm* — C. Michael Geise

(57) ABSTRACT

A composition comprising a first fluoropolymer and a second fluoropolymer. The first and second fluoropolymers are melt-processable, thermoplastic and have a melting point between 100° C. and 320° C. The first fluoropolymer has a relaxation exponent of from 0.93 to 1.0. The second fluoropolymer has a relaxation exponent of from 0.3 to 0.92. A composition comprising a first fluoropolymer having a long chain branching index of from 0 to 0.1 and a second fluoropolymer having a long chain branching index of at least 0.2. A composition comprising a core-shell polymer having a first polymer portion, wherein a polymer having an identical chemical structure as the first polymer portion has a relaxation exponent of from 0.93 to 1.0, and a second fluoropolymer portion, wherein a polymer having an identical chemical structure as the second fluoropolymer portion has a relaxation exponent of from 0.3 to 0.92. Methods for making compositions and methods of making articles from compositions.

4 Claims, No Drawings

COMPOSITIONS COMPRISING MELT-PROCESSABLE THERMOPLASTIC FLUOROPOLYMERS AND METHODS OF MAKING THE SAME

BACKGROUND

Fluoropolymers have been used in a variety of applications because of several desirable properties such as heat resistance, chemical resistance, weatherability, and UV-stability. Fluoropolymers include homo and co-polymers of a gaseous fluorinated olefin such as tetrafluoroethylene (TFE), chlorotrifluoroethylene (CTFE) and/or vinylidene fluoride (VDF) with one or more gaseous or liquid comonomers such as hexafluoropropylene (HFP) or perfluorovinyl ethers (PVE) or non-fluorinated olefins such as ethylene (E) and propylene (P).

Fluoropolymers include melt-processable and non-melt-processable polymers. For example, polytetrafluoroethylene and copolymers of tetrafluoroethylene with small amounts (e.g. not more than 0.5% by weight) of a comonomer are generally not melt-processable with conventional equipment because of high molecular weight and high melt viscosity. Accordingly, for these non-melt-processable fluoropolymers, special processing techniques have been developed for forming these fluoropolymers into desired articles and shapes.

Melt-processable thermoplastic fluoropolymers are also known and these can be obtained from various combinations of fluorinated and/or non-fluorinated monomers. As they are melt-processable, they can be processed with conventional equipment. Melt-processable thermoplastic fluoropolymers include generally amorphous fluoropolymers and fluoropolymers that have substantial crystallinity. Fluoropolymers that are generally amorphous are typically used to make fluoroelastomers by curing or vulcanizing the fluoropolymer. Although, the elastomeric properties generally are obtained after curing, the fluoropolymers used for making the fluoroelastomer are often also called fluoroelastomer. Melt-processable thermoplastic fluoropolymers that have substantial crystallinity and that accordingly have a clearly detectable and prominent melting point are known in the art as fluorothermoplasts or thermoplastic fluoropolymers.

The rate of extrusion of fluorothermoplast is limited to the speed at which the polymer melt undergoes melt fracture. This may be important in thermoforming processes such as wire and cable extrusion, film extrusion, blown film extrusion and injection molding. If the rate of extrusion exceeds the rate at which melt fracture occurs (known as critical shear rate), an undesired rough surface of the extruded article is obtained. Bimodal fluorothermoplasts, for instance, THV and FEP, have been used in attempts to increase the extrusion speed by a substantially broadening the molecular weight distribution (MWD) of the extruded polymer, thereby increasing the critical shear rate. The gain in critical shear rate, however, is typically accompanied by weaker overall mechanical properties such as flex life.

The process rate of fluorothermoplasts in wire and cable extrusion can also be increased by using an extrusion die with a relatively large orifice and then drawing the extruded melt to the desired final diameter. The melt draw is commonly characterized by the draw down ratio calculated as the ratio of the cross-sectional area of the die opening to the ratio of the cross-sectional area of the finished extrudate. Typical draw down ratios of wire and cable extrusions are on the order of about 100. This melt draw, however, includes that high elongational rates, which characterize the rate of the melt draw, are usually in the order of 1 to 1000 l/s. The polymer melt should exhibit a sufficiently high elongational viscosity. Otherwise the cone stability of the polymer melt in the extrusion will be insufficient, which results in undesired diameter variations of the extruded article as well as frequent cone-breaks.

Further attempts to increase the cone stability have included the use of perfluoro vinylethers (PVE), for example with FEP. PVEs have been added (as comonomers in fluorothermoplasts) in an attempt to retain mechanical properties while increasing the processing speed of the fluorothermoplasts. But, the additional incorporation of PVEs into fluorothermoplasts increases the manufacturing costs, which may not be desired. Furthermore, the formation of die deposits ("die drool") may occur, particularly with a broad MWD of the fluorothermoplast. In fast extrusion procedures, such as wire & cable insulation, large accumulation of die deposits separate from the die and may cause break-off of the melt cone ("cone-break") and thus interruption of the production.

SUMMARY

There exists a need for fluorothermoplasts that can be melt-processed at higher shear rates and that have a high elongational viscosity. A need further exists to find fluorothermoplasts that have high critical shear rates and/or high draw-down ratios preferably without causing other disadvantages such as reduced mechanical properties, increased cost and/or causing other processing disadvantages. Desirably, the thermal stability of the fluorothermoplasts is unaffected or improved and the fluorothermoplast can be readily manufactured in an environmentally friendly way preferably through aqueous emulsion polymerization.

In one aspect, the present invention relates to a composition of a melt-processable and thermoplastic fluoropolymer with a melting point between 100° C. and 320° C. comprising a first fluoropolymer having a relaxation exponent of from 0.93 to 1.0 and a second fluoropolymer having a relaxation exponent of from 0.3 to 0.92.

In another aspect, the present invention relates to a composition of a melt-processable and thermoplastic fluoropolymer with a melting point between 100° C. and 320° C. comprising first fluoropolymer having a long chain branching index of from 0 to 0.1 and a second fluoropolymer having a long chain branching index of at least 0.2.

In some embodiments, it was found that such compositions have an increased critical shear rate compared to the critical shear rate of the first fluoropolymer alone. Also in some embodiments, the compositions exhibited a marked strain hardening, which generally increases the melt tension under elongational deformation (draw down). This phenomenon is not observed with conventional state-of-the-art polymers of having linear polymer chain architecture. Strain hardening induces the ability of the melt to heal up in homogeneities of the cone (so-called self healing effect). As a result, in such embodiments, the insulation thickness of an extruded cable may show an improved homogeneity. This rheological characteristic makes such embodiments of the compositions suitable in applications with high draw down ratios.

In yet another aspect, the present invention relates to a method for making a composition that is melt-processable and thermoplastic and that has a melting point of from 100° C. to 320° C. The method comprises polymerizing to form a first fluoropolymer having a relaxation exponent of from 0.93 to 1.0 and polymerizing to form a second fluoropolymer having a relaxation exponent of from 0.3 to 0.92. In one embodiment, one of the polymerizing of the first or second fluoropolymers takes place in the presence of the other, such as seed polymerization.

In another aspect, the invention relates to a method for making a composition that is melt-processable and thermoplastic and that has a melting point of from 100° C. to 320° C. The method comprises blending a first fluoropolymer having a relaxation exponent of from 0.93 to 1.0 and a second fluoropolymer having a relaxation exponent of from 0.3 to 0.92.

In a further aspect, the present invention relates to a composition and a method for making a composition comprising a core-shell polymer having a first fluoropolymer portion, wherein a polymer having an identical chemical structure as the first polymer portion has a relaxation exponent of from 0.93 to 1.0, and a second fluoropolymer portion, wherein a polymer having an identical chemical structure as the second fluoropolymer portion has a relaxation exponent of from 0.3 to 0.92.

In yet a further aspect, the present invention relates to the use of the above-described compositions in the extrusion of an article, in particular in the extrusion of wires and cables, tubes and films.

In connection with the present invention, a fluoropolymer is considered to be melt-processable if the melt viscosity of the polymer is low enough such that the polymer can be processed in conventional extrusion equipment used to extrude polymers. This typically requires that the melt viscosity at the processing temperature e.g. 250 to 400° C., be no more than $10^6$ Pa*s, preferably $10^2$ to $10^5$ Pa*s.

The term "copolymer" in connection with the present invention should generally be understood to mean a polymer comprising repeating units derived from the recited monomers without excluding the option of other further repeating units being present that derive from other monomers not explicitly recited. Accordingly, for example the term 'copolymer of monomers A and B' includes binary polymers of A and B as well as polymers that have further monomers other than A and B, such as terpolymers and quadpolymers.

DETAILED DESCRIPTION

In one aspect, the present invention relates to a composition comprising of a melt-processable and thermoplastic fluoropolymer with a melting point between 100° C. and 320° C. comprising a first fluoropolymer having a relaxation exponent of from 0.93 to 1.0 and a second fluoropolymer having a relaxation exponent of from 0.3 to 0.92.

In one embodiment, the second fluoropolymer is derived from (a) one or more gaseous fluorinated monomers; (b) one or more modifiers; and (c) optionally one or more comonomers selected from non-gaseous fluorinated monomers and non-fluorinated monomers. In one embodiment, the one or more modifiers is an olefin that has on at least one carbon of the double bond a bromine or iodine atom. The olefin may, apart from containing Br and/or I atoms, be non-fluorinated, i.e. not contain fluorine atoms, may be partially fluorinated, i.e. some but not all hydrogen atoms have been replaced with fluorine atoms, or the olefin may be a perfluorinated compound in which all hydrogen atoms have been replaced with fluorine atoms except for those replaced with I or Br.

In a particular embodiment, the olefin may correspond to the general formula:

$$X_2C=CXZ \quad (II)$$

wherein each X may be the same or different and is selected from the group consisting of hydrogen, F, Cl, Br and I, with the proviso that at least one X represents Br or I, Z represents hydrogen, F, Cl, Br, I, a perfluoroalkyl group, a perfluoroalkoxy group or a perfluoropolyether group. Examples of perfluoroalkyl groups include linear or branched perfluoroalkyl groups having between 1 and 8 carbon atoms, for example 1 to 5 carbon atoms. Examples of perfluoroalkoxy groups include those that have between 1 and 8 carbon atoms, for example between 1 and 5 carbon atoms, in the alkyl group, and whereby the alkyl group may be linear or branched. Examples include perfluoropolyether groups, such as those corresponding to the formula:

$$-O(R^1_fO)_n(R^2_fO)_mR^3_f$$

wherein $R^1_f$ and $R^2_f$ are each linear or branched perfluoroalkylene groups of 1 to 6 carbon atoms, in particular 2 to 6 carbon atoms; m and n are independently 0 to 10 with m+n being at least 1; and $R^3_f$ is a perfluoroalkyl group of 1 to 6 carbon atoms.

In a particular embodiment, olefins of formula (II) can be employed wherein X is selected from hydrogen, F and Br with the proviso that at least one X represents Br and Z is hydrogen, F, Br, a perfluoroalkyl group or a perfluoroalkoxy group. Specific examples of olefins include 1-bromo-1,2,2,-trifluoroethylene, bromotrifluoroethylene (referred as BTFE), vinylbromide, 1,1-dibromoethylene, 1,2-dibromoethylene, 1-bromo-2,3,3,3-tetrafluoro-propene, and 1-bromo-2,2-difluoroethylene (BDFE). It is also contemplated to use a mixture of the bromine or iodine containing olefins.

In other embodiments, the second fluoropolymer is a non-thermosettable copolymer of tetrafluoroethylene copolymerized with a small amount of an iodo(perfluoroalkyl)ethylene. In particular, the iodo(perfluoroalkyl)ethylene may be 4-iodo-3,3,4,4-tetrafluorobutene-1 (ITFB). One having ordinary skill in the art will recognize that the modifier is not particularly limited, so long as the resulting polymer has a relaxation exponent of less or equal to 0.92, for instance, from 0.3 to 0.92.

In a further embodiment of the present invention, the modifier may correspond to the formula:

$$Z_2C=CZ-R_f-Br \quad (I)$$

wherein each Z independently represents hydrogen, fluorine, bromine, chlorine or iodine; $R_f$ is a perfluoroalkylene group, typically having 1 to 8 carbon atoms, a perfluorooxyalkylene group or a divalent perfluoropolyether group. The bromine may be contained in a terminal position (i.e., on a primary carbon atom) of the $R_f$ group, but may alternatively be contained along the chain of the $R_f$ group (that is, on a secondary or tertiary carbon atom). Examples of olefins according to formula (I) include:

$CH_2=CH-(CF_2)_x-CF_2Br$, where x is from 0 to 5;
$CF_2=CF-(CF_2)_x-CFBr-CF_3$, where x is from 0 to 5;
$CF_2=CF-(CF_2)_x-CF_2Br$, where x is from 0 to 5;
$CH_2=CH-O-(CF_2)_x-CF_2Br$, where x is from 0 to 5;
$CF_2=CF-O-(CF_2)_x-CF_2Br$, where x is from 0 to 5;
$CF_2=CF-(O-CF_2-CF_2-O)_x-(CF_2)_y-CF_2Br$, where x is from 0 to 3, and y is from 0 to 5;
$CF_2=CF-O-(CF_2-CF(CF_3)-O-)_x-(CF_2)_y-CF_2Br$, where x is from 0 to 3, and y is from 0 to 5;
$CF_2=CH-O-(CF_2)_x-CF_2Br$, where x is from 0 to 5; and
$CH_2=CF-O-(CF_2)_x-CF_2Br$, where x is from 0 to 5.

In still a further embodiment of the invention, a mixture of olefins according to formula (I) with one or more olefins having a bromine or iodine atom at the double bond is used.

In another embodiment, the modifier may be represented by the formula $CH_2=CH-R_f-CH=CH_2$, wherein $R_f$ is selected from a divalent perfluoroaliphatic group optionally containing one or more 0 atoms, a perfluoroarylene group, and a perfluoroalkarylene group. The divalent perfluoroaliphatic group includes, for instance, perfluoroalkylene groups and perfluorooxyalkylene groups. Included in this embodiment are, for instance, 1,8-divinyl perfluoro(octane); 1,6-divinyl perfluoro(hexane); and 1,4-divinyl perfluoro(butane).

In yet another embodiment, the modifier may be a monomeric unit deriving from a bis-olefin. One such bis-olefin may be described as having the general formula:

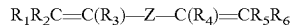

wherein each $R_1$, $R_2$, $R_3$, $R_4$, $R_5$, and $R_6$ is independently selected from H, F, an alkyl group having from 1 to 5 carbon atoms, or fluorinated alkyl group having from 1 to 5 carbon atoms; Z is an alkylene or cycloalkylene group having from 1 to 18 carbon atoms, which may be linear or branched and which optionally contains oxygen atoms, which may also be partially fluorinated or perfluorinated. For instance, Z may be a perfluoroalkylene group having 4 to 12 carbon atoms, for instance 4 or more carbon atoms, 6 or more, or even 8 or more, up to 6 carbon atoms, up to 8 carbon atoms, or even up to 12 carbon atoms.

When Z is a perfluoropolyoxyalkylene group, it may have the formula:

$$-(Q)_p-CF_2O-(CF_2CF_2O)_m(CF_2O)_n-CF_2-(Q)_p-$$

wherein each Q is independently an alkylene or oxyalkylene group having 1 to 10 carbon atoms; each p is independently 0 or 1; m and n are integers such that the m/n ratio is from 0.2 to 5 and the molecular weight of the perfluoropolyoxyalkylene group is from 500 to 10,000, in particular from 1,000 to 4,000. In some embodiments, Q is selected from $-CH_2OCH_2-$, and $-CH_2O(CH_2CH_2O)_sCH_2-$, wherein s is from 1 to 3.

The second fluoropolymers according to the present description have so-called long chain branches. That is, the polymers are not linear, in that one or more branches from the backbone are present. Without intending to be bound by theory, it is believed that these branches result from abstraction of the bromine or iodine atom from the modifier once it is polymerized into the backbone of the fluoropolymer. The so-produced radical on the backbone may then cause further polymerization with the result that a polymeric chain is formed as a branch on the backbone. Such branches are known in the art as long chain branches or LCBs.

The second fluoropolymers for use in the melt-processable polymer composition are non-linear polymers i.e. branched polymers. If the fluoropolymer is soluble in an organic solvent, the level of branching or non-linearity can be characterized through the long chain branching index (LCBI). The LCBI can be determined as described in R. N. Shroff, H. Mavridis; *Macromol*, 32, 8464-8464 (1999) & 34, 7362-7367 (2001) according to the equation:

$$LCBI = \frac{\eta_{0,br.}^{1/a}}{[\eta]_{br.}} \cdot \frac{1}{k^{1/a}} - 1 \qquad \text{eq. 1}$$

In the above equation, $\eta_{0,br}$ is the zero shear viscosity (units Pa*s) of the branched fluoropolymer measured at a temperature T and $[\eta]_{br}$ is the intrinsic viscosity (units ml/g) of the branched fluoropolymer at a temperature T' in a solvent in which the branched fluoropolymer can be dissolved and a and k are constants. These constants are determined from the following equation:

$$\eta_{0,lin} = k \cdot [\eta]_{lin}^a \qquad \text{eq. 2}$$

wherein $\eta_{0,lin}$ and $[\eta]_{lin}$ represent respectively the zero shear viscosity and intrinsic viscosity of the corresponding linear fluoropolymer measured at the respective same temperatures T and T' and in the same solvent. Thus, the LCBI is independent of the selection of the measurement temperatures and solvent chosen, provided, of course, that the same solvent and temperatures are used in equations 1 and 2.

The values a and k, along with the test conditions for some of the fluoropolymers that may be used in the melt-processable polymer composition are set forth:

| Polymer | test condition | a-value | k-value |
|---|---|---|---|
| $TFE_{39}/HFP_{11}/VDF_{50}$ | A | 5.3 | $2.5 \times 10^{-7}$ |
| $TFE_{24.5}/HFP_{23}/VDF_{52.5}$ | A | 5.3 | $3.8 \times 10^{-7}$ |
| $VDF_{78}/HFP_{22}$ | A | 5.3 | $1.3 \times 10^{-7}$ |
| polyvinylidene fluoride | B | 5.3 | $1.2 \times 10^{-7}$ |
| polyvinylidene fluoride | C | 5.3 | $2.2 \times 10^{-7}$ |

In the above, the indexes to the monomer units in the polymer indicate the amount of the respective unit in mole % and the test conditions are as follows:

A: shear viscosity at 265° C. and the intrinsic viscosity in methyl ethyl ketone at 35° C.

B: shear viscosity at 230° C. and the intrinsic viscosity in dimethylformamide at 23° C.

C: shear viscosity at 230° C. and the intrinsic viscosity in dimethylformamide at 110° C.

It can be observed from the above that the constant "a" appears to be independent of the fluoropolymer tested, whereas the k-value varies with composition of the fluoropolymer and test condition used.

The LCBI of the second fluoropolymer may, for instance, have a value of at least 0.2. The LCBI of the second fluoropolymer may be at least 0.3, at least 0.4, or even at least 0.5. The upper limit of the LCBI is not particularly limited by the present invention, and may be up to 10, up to 5, or even up to 2. Generally, the effectiveness of the second fluoropolymer to decrease melt defects will increase with increasing value of the LCBI for polymers having similar zero shear rate viscosities ($\eta_0$). However, when the level of branching (and thus the LCBI value) becomes too large, the fluoropolymer may have a gel fraction that cannot be dissolved in an organic solvent. This observation may provide a practical limit to the operating range of a fluoropolymer processor, but does not necessarily indicate an upper limit for the invention described herein. At such high levels of branching, the advantageous effects of the fluoropolymer on the processing of the melt-processable polymer composition may be reduced, as the melt viscosity of the fluoropolymer becomes too high. One skilled in the art, through routine experimentation, may readily determine the appropriate value of LCBI. Generally, the LCBI may be from 0.2 to 5, for instance from 0.4 to 2.0.

If a fluoropolymer is insoluble in any organic solvent, the level of branching or non-linearity can alternatively be characterized through the relaxation exponent n. One means of determining the relaxation exponent includes taking oscillatory shear flow measurements on fluoropolymer melts using a strain controlled rheometer equipped with a force transducer. Dynamic mechanical may be plotted against phase angle, δ (measured in frequency). A strain, typically ascending from 1 to 20%, may be applied. Zero shear viscosities $\eta_0$, may be extrapolated from the viscosity function $\eta^*(\omega)$ using the 4 parameter Carreau fit function. Using the so-obtained zero shear viscosities $\eta_0$ and the intrinsic viscosity $[\eta]$, the long chain branching index LCBI may be evaluated according to equation 1. The phase angle at gel point $\delta_c$, needed to evaluate the relaxation exponent n ($n = \delta_c/90°$), is selected from the frequency where the $1^{st}$ derivative of $\delta(\omega)$ passes the maximum or the $2^{nd}$ derivative passes zero. Transient elongational viscosity functions in shear $\eta_0^+(t)$, needed to evaluate the quantity of strain hardening may also be calculated from the frequency sweep. Herein, the elongational viscosity may be obtained by multiplying the viscosity $\eta^*$ by factor of 3 (according to the Trouton rule) and the time t may be obtained from the inverse frequency (t=1/ω). The relaxation exponent n of a branched fluoropolymer is typically up to 0.90, for instance, from 0.2 and above, from 0.3 and above, even from 0.35 and above, up to 0.85, even up to 0.92. In general, the closer n is to 1, the fewer branches that are present.

The level of long chain branches and relaxation exponent of a fluorothermoplast can be readily and reproducibly controlled by varying the amount of the modifier used. Thus, in general, a lower amount of the modifier will produce a higher relaxation exponent and a larger amount of modifier will decrease the relaxation exponent. Although other factors, such as the polymerization conditions may to some extent also influence the level of long chain branches and the relaxation exponent, the amount of the modifier needed will typically be up to 0.4% by weight based on the total weight of monomers fed to the polymerization. A useful amount of modifier may be from 0.01% by weight, or even from 0.05%, and up to 0.25% by weight, even up to 0.4% by weight, or higher. The modifier can be added at the start of the polymerization and/or may be added during the polymerization in a continuous way and/or portion-wise.

The second fluoropolymers of the present description may be crystalline, with a melting point of from 100 to 320° C. These second fluoropolymers are not curable or only marginally curable using a peroxide cure system, despite the fact that, when used, some of the modifiers may contain bromine and/or iodine atoms, which could introduce bromine and/or iodine atoms into the polymer chain. The amount of the modifier, when used, is so small that any bromine or iodine atom that may remain present after the polymerization reaction is insufficient to allow any substantial curing as is observed and required in the making of fluoroelastomers.

The polymer compositions comprising the first and second fluoropolymer are characterized by the fact that it shows a marked strain hardening. Strain hardening can be quantified by the dimensionless strain hardening coefficient S. One skilled in the art through routine experimentation may readily determine the appropriate value of S through various ways. One way to determine S is by running elongational experiments in a deformation controlled rheometer equipped with a special elongational device. In this commercially available instrumental setup, the second fluoropolymers of the compositions of the present invention show a strain hardening coefficient S of at least 1.2 at elongational rates $\epsilon_0^\bullet$ ranging from 0.3 to 10 l/s. A polymer with S smaller than 1.2 at elongational rate of $\epsilon_0^\bullet$=1 l/s is classified as having a linear polymer chain architecture.

An alternative way to determine S is given by a melt spinning apparatus that is capable of measuring the spinning force. Well-known apparatuses include, for instance, the Rheotens. The maximal spinning force $F_{max.}$ divided by the extrusion pressure p recorded under defined conditions (defined die geometry and a defined extrusion rate) is related to the strain hardening. The second fluoropolymers described herein show a technological coefficient $F_{max}/p$, given in units of cN/bar, of at least 0.064. A polymer with $F_{max}/p$ smaller than 0.064 may be classified as a linear polymer. The technological coefficient $F_{max}/p$ correlates with the strain hardening coefficient S in the following way:

$$F_{max.}[cN]/p[bar] = -0.055 + 0.099 \times S \qquad \text{eq. 3}$$

The first and second fluoropolymers described herein can be obtained with any of the known polymerization techniques including solution polymerization, suspension polymerization, and polymerization in supercritical $CO_2$. The first and second fluoropolymers may also be made through an aqueous emulsion polymerization process. The reactor vessel for use in the aqueous emulsion polymerization process is typically a pressurizable vessel capable of withstanding the internal pressures during the polymerization reaction. Typically, the reaction vessel will include a mechanical agitator, which will produce thorough mixing of the reactor contents and heat exchange system. Any quantity of the fluoromonomer(s) may be charged to the reactor vessel. The monomers may be charged batch-wise or in a continuous or semi-continuous manner. The independent rate at which the monomers are added to the kettle will depend on the consumption rate of the particular monomer with time. Preferably, the rate of addition of monomer will equal the rate of consumption of monomer, i.e. conversion of monomer into polymer.

The reaction kettle is charged with water, the amounts of which are not critical, to provide an aqueous phase. To the aqueous phase is generally also added a fluorinated surfactant, typically a non-telogenic fluorinated surfactant. Of course, methods employing polymerization methods free of added fluorinated surfactant are also suitable. When used, a fluorinated surfactant is typically used in amount of 0.01% by weight to 1% by weight. Suitable fluorinated surfactants include any fluorinated surfactant commonly employed in aqueous emulsion polymerization. Particularly preferred fluorinated surfactants are those that correspond to the general formula:

$$Y\text{—}R_f\text{-}Z\text{-}M$$

wherein Y represents hydrogen, Cl or F; $R_f$ represents a linear or branched perfluorinated alkylene having 4 to 10 carbon atoms; Z represents COO— or $SO_3$— and M represents an alkali metal ion or an ammonium ion. Particular fluorinated surfactants for use in this invention are the ammonium salts of perfluorooctanoic acid and perfluorooctane sulphonic acid. Mixtures of fluorinated surfactants can also be used. Also contemplated for use in the preparation of the polymers described herein are fluorinated polyether surfactants, such as described in EP 1,189,953.

A chain transfer agent may be charged to the reaction kettle prior to the initiation of the polymerization. Useful chain transfer agents include $C_2$ to $C_6$ hydrocarbons such as ethane, alcohols, ethers, esters including aliphatic carboxylic acid esters and malonic esters, ketones and halocarbons. Particularly useful chain transfer agents are dialkylethers such as dimethyl ether and methyl tertiary butyl ether. Further additions of chain transfer agent in a continuous or semi-continuous way during the polymerization may also be carried out. For example, a fluoropolymer having a bimodal molecular weight distribution is conveniently prepared by first polymerizing fluorinated monomer in the presence of an initial amount of chain transfer agent and then adding at a later point in the polymerization further chain transfer agent together with additional monomer.

The polymerization is usually initiated after an initial charge of monomer by adding an initiator or initiator system to the aqueous phase. For example, peroxides can be used as free radical initiators. Specific examples of peroxide initiators include, hydrogen peroxide, diacylperoxides such as diacetylperoxide, dipropionylperoxide, dibutyrylperoxide, dibenzoylperoxide, benzoylacetylperoxide, diglutaric acid peroxide and dilaurylperoxide, and further water soluble peracids and water soluble salts thereof such as e.g. ammonium, sodium or potassium salts. Examples of per-acids include peracetic acid. Esters of the peracid can be used as well and examples thereof include tertiary-butylperoxyacetate and tertiary-butylperoxypivalate. A further class of initiators that can be used are water soluble azo-compounds. Suitable redox systems for use as initiators include for example a combination of peroxodisulphate and hydrogen sulphite or disulphite, a combination of thiosulphate and peroxodisulphate or a combination of peroxodisulphate and hydrazine. Further initiators that can be used are ammonium-alkali- or earth alkali salts of persulfates, permanganic or manganic acid or manganic acids. The amount of initiator employed is typically between 0.03 and 2% by weight, preferably between 0.05 and 1% by weight based on the total weight of the polymerization mixture. The full amount of initiator may be added at the start of the polymerization or the initiator can be added to the polymerization in a continuous way during the polymerization until a conversion of 70 to 80%. One can also add part of the initiator at the start and the remainder in one or separate additional portions during the polymerization. Accelerators such as for example water-soluble salts of iron, copper and silver may also be added.

During the initiation of the polymerization reaction, the sealed reactor kettle and its contents are conveniently preheated to the reaction temperature. Polymerization temperatures may be from 20° C., from 30° C., or even from 40° C. and may further be up to 100° C., up to 110° C., or even up to 150° C. The polymerization pressure may range, for instance, from 4 to 30 bar, in particular from 8 to 20 bar. The aqueous emulsion polymerization system may further comprise auxiliaries, such as buffers and complex-formers.

The amount of polymer solids that can be obtained at the end of the polymerization is typically at least 10% by weight, or even at least 20% by weight, and up to 40% by weight, and even up to 45% by weight; and the average particle size of the resulting fluoropolymer is typically between 50 nm and 500 nm.

The (aqueous emulsion) polymerization process comprises polymerizing one or more gaseous fluorinated monomer which may be perfluorinated or not. Examples of a gaseous fluorinated monomer include tetrafluoroethylene, chlorotrifluoroethylene, vinylidene fluoride, perfluoroalkyl vinyl monomers such as hexafluoropropylene, fluorinated allyl ethers, which may be perfluorinated, and fluorinated vinyl ethers, which may also be perfluorinated, such as perfluoromethyl vinyl ether. Comonomers that can be used for copolymerization with the gaseous fluorinated monomers include non-gaseous fluorinated monomers, i.e. fluorinated monomers that under the conditions of polymerization are in a liquid phase, and non-fluorinated monomers such as ethylene and propylene.

Examples of perfluorovinyl ethers that can be used in the process of the invention include those that correspond to the formula:

$$CF_2=CF-O-R_f$$

wherein $R_f$ represents a perfluorinated aliphatic group that may contain one or more oxygen atoms. Particularly preferred perfluorinated vinyl ethers correspond to the formula:

$$CF_2=CFO(R^a_fO)_n(R^b_fO)_mR^c_f$$

wherein $R^a_f$ and $R^b_f$ are different linear or branched perfluoroalkylene groups of 1 to 6 carbon atoms, in particular 2 to 6 carbon atoms, m and n are independently 0 to 10 and $R^c_f$ is a perfluoroalkyl group of 1 to 6 carbon atoms. Specific examples of perfluorinated vinyl ethers include perfluoro methyl vinyl ether (PMVE), perfluoro n-propyl vinyl ether (PPVE-1), perfluoro-2-propoxypropylvinyl ether (PPVE-2), perfluoro-3-methoxy-n-propylvinyl ether, perfluoro-2-methoxy-ethylvinyl ether and $CF_3-(CF_2)_2-O-CF(CF_3)-CF_2-O-CF(CF_3)-CF_2-O-CF=CF_2$. Some of the aforementioned perfluorovinyl ethers will be liquid under the conditions of polymerization and are thus non-gaseous fluorinated monomers. Suitable perfluoroalkyl vinyl monomers correspond to the general formula:

$$CF_2=CF-R^d_f \text{ or } CH_2=CH-R^d_f$$

wherein $R^d_f$ represents a perfluoroalkyl group of 1 to 10, preferably 1 to 5 carbon atoms. A typical example of a perfluoroalkyl vinyl monomer is hexafluoropropylene.

Examples of fluoropolymers that may be produced with the process according to the invention include a copolymer of tetrafluoroethylene and hexafluoropropylene, a copolymer of tetrafluoroethylene and perfluorovinyl ether (e.g. PMVE, PPVE-1, PPVE-2 or a combination of PPVE-1 and PPVE-2), a copolymer of vinylidene fluoride and hexafluoropropylene, a copolymer of tetrafluoroethylene and vinylidene fluoride, a copolymer of chlorotrifluoroethylene and vinylidene fluoride, a copolymer of tetrafluoroethylene and ethylene, a copolymer of tetrafluoroethylene and propylene, a copolymer of vinylidene fluoride and perfluorovinyl ether (e.g. PMVE, PPVE-1, PPVE-2 or a combination of PPVE-1 and PPVE-2), a terpolymer of tetrafluoroethylene, hexafluoropropylene and perfluorovinyl ether (e.g. PMVE, PPVE-1, PPVE-2 or a combination of PPVE-1 and PPVE-2), a terpolymer of tetrafluoroethylene, ethylene or propylene and perfluorovinyl ether (e.g. PMVE, PPVE-1, PPVE-2 or a combination of PPVE-1 and PPVE-2), a terpolymer of tetrafluoroethylene, ethylene or propylene and hexafluoropropylene, a terpolymer of tetrafluoroethylene, vinylidene fluoride and hexafluoropropylene, a terpolymer of vinylidene fluoride, tetrafluoroethylene and perfluorovinyl ether (e.g. PMVE, PPVE-1, PPVE-2 or a combination of PPVE-1 and PPVE-2), and a copolymer of tetrafluoroethylene, ethylene or propylene, hexafluoropropylene and perfluorovinyl ether (e.g. PMVE, PPVE-1, PPVE-2 or a combination of PPVE-1 and PPVE-2).

As mentioned above, in the synthesis of the second fluoropolymer, the modifier, when used, may be added to the polymerization vessel in portions or in a continuous way. The modifier may be fed to the polymerization from a separate inlet or storage cylinder. Alternatively, a mixture of the modifier with a fluorinated monomer may be used to feed the modifier to the polymerization. The latter method may provide improved homogeneous incorporation of the modifier into the second fluoropolymer leading to a more uniform distribution of long chain branches. Suitable fluorinated monomers with which the modifier can be admixed to feed to the polymerization include fluorinated olefins such as CTFE, HFP and perfluorovinyl ethers such as perfluoromethyl vinyl ether.

In yet another aspect, the present invention relates to a composition and a method for making a composition comprising a core-shell polymer having a first fluoropolymer portion, wherein a polymer having an identical chemical as the first portion has a relaxation exponent of from 0.93 to 1.0, and a second fluoropolymer portion, wherein a polymer having an identical chemical structure as the second fluoropolymer portion has a relaxation exponent of from 0.3 to 0.92.

In some embodiments, the second fluoropolymer portion has a fluorine content that is within 40% of the first fluoropolymer portion, even within 30%, within 20%, or within 10%. In other embodiments, the fluorine content of the two portions differs by at least 1%, differs by at least 5%, differs by at least 10%, or even by at least 20%. In still other embodiments, the fluorine content of the two portions is the same.

The core-shell polymer, as well as the polymers having an identical chemical structure as each of the first and second fluoropolymer portions, is melt-processable and thermoplastic and each has a melting point between 100° C. and 320° C.

The method comprises polymerizing, preferably by aqueous emulsion polymerization, (a) one or more first gaseous fluorinated monomers; with (b) one or more modifiers; and (c) optionally one or more first comonomers selected from non-gaseous fluorinated monomers and non-fluorinated monomers. The method further comprises adding a chain transfer agent to the polymerization. When a chain transfer agent is added after the polymerizing of the one or more gaseous fluorinated monomers and the one or more modifiers with the optional comonomers, the chain transfer agent may be added in a sufficient quantity to control the average chain length of the thus-obtained polymer molecules. With this sequence, the second fluoropolymer portion is formed. Subsequently, or alternatively prior to, the polymerization of the second fluoropolymer portion, the method may comprise polymerizing, in the absence of the one or more modifiers, one or more second gaseous fluorinated monomers and optionally one or more second comonomers. The second gaseous fluorinated monomers and the optional second comonomers may be the same as the first gaseous fluorinated monomers and the optional first comonomers. This step produces the first fluoropolymer portion. The first fluoropolymer portion may make up either the core or the shell, and the second fluoropolymer portion may make up the other.

In the core-shell polymer, there may not be an abrupt changeover from the chemical structure of the core polymer and the shell polymer. That is, the core-shell polymer need not be a block copolymer. It may be that the first fluoropolymer portion and the second fluoropolymer portion are separated by a portion wherein the chemical composition of the core is transitioning to the chemical composition of the shell. This transition portion may have a general chemical structure having some characteristics of the core polymer and some chemical characteristics of the shell polymer. The relative amount of these chemical characteristics in the transition region will change from heavily core-resembling near the core polymer to heavily shell-resembling near the shell polymer. As noted above, either the first or second fluoropolymer may comprise the core, with the other comprising the shell.

An abrupt change in chemical composition may be present in the core-shell polymers contemplated herein. Such a structure may be obtained, for instance, by preparation of the core-shell polymer using a so-called seed latex.

In some embodiments, the one or more modifiers are used in amount of typically up to 0.4% by weight based on the total weight of monomers fed to the polymerization, particularly between 0.01 and 0.4% (or higher) by weight. The modifier may be added in any amount as described herein for the formation of the second fluoropolymer.

The isolated first and second fluoropolymers, such as PFA and FEP, or the core-shell polymer, may be post-fluorinated subsequent to the polymer workup. During post-fluorination, any remaining hydrogen, bromine and/or iodine atoms in the fluoropolymer can be replaced with fluorine atoms. Further, any unstable end groups such as carboxylic acid groups, COF groups, amide groups, and —$CF_2CH_2OH$ groups, which may during melt processing of the fluoropolymer decompose and form HF, can be converted into stable $CF_3$ groups. The post-fluorination may be conducted under conditions sufficient such that not more than 30, not more than 20, or even not more than 10 unstable end groups per million carbon atoms are present in the fluoropolymer. Accordingly, a highly inert fluoropolymer may thereby be obtained. The post-fluorination may be carried out on the first or second fluoropolymer, on neither, or on both.

In yet another aspect, the present description provides a method for making a composition comprising a first fluoropolymer having a relaxation exponent of from 0.93 to 1.0 and a second fluoropolymer having a relaxation exponent of from 0.30 to 0.92. For this method, as well as for the compositions and the other methods described herein, the monomer composition of the two fluoropolymers may be the same or can be different. The method comprises mixing the first fluoropolymer and the second fluoropolymer. The mixing may comprise mixing a dispersion, for instance an aqueous dispersion, of each of the first and second fluoropolymers. The method may further comprise coagulating the dispersion mixture. The mixing may also be carried out by any of a number of other techniques, including the blending the agglomerates of the first and the second fluoropolymers in a static mixer. The homogeneity of the blend can be further improved by an additional melt blend step, e.g. extrusion in a single screw, or a twin screw extruder, or in an internal mixer (e.g., a Brabury mixer).

The compositions may contain a first and second fluoropolymer as described herein, in any relative amount. For instance, the presence of a second polymer may be in at least 90% by weight based on the total weight of the composition, at least 50%, at least 20%, at least 10%, at least 5%, or even at least 0.1% by weight. The first fluoropolymer may be present in up to 10% by weight based on the total weight of the composition, up to 50%, up to 80%, up to 90%, up to 95%, or even up to 99.9% by weight.

The compositions described herein are suitable for making a variety of articles and are in particular suitable in extrusion processing involving high elongational rates to produce articles. For example, the compositions can be used to make wires and cables in which they may present the advantage of having a high critical shear rate combined with a strain hardening behavior so that they can be rapidly processed and can be processed with high draw down ratios that may be used in wire and cable extrusion. The strain hardening behavior is characterized by a strain hardening coefficient S of at least 1.2 or alternatively, a technological coefficient $F_{max}/p$ of at least 0.064. Generally, these properties are obtained without sacrificing the mechanical properties. Furthermore because of the strain hardening properties that the compositions according to the invention may possess, any diameter fluctuations that may result at high processing speeds with a high draw down ratio in cable or wire extrusion generally disappear during the cable extrusion with the high drawing force applied to the cable or wire. This is to be contrasted, for instance, to polymer blends comprising linear fluorothermoplasts that do not contain a second fluoropolymer as described herein, in which cone breaking of the cable insulation would occur under high drawing forces at those spots were the cable diameter is low as a result of diameter fluctuations occurring in the drawing process.

The compositions may further be used in coating applications such as for example for coating outdoor fabric, making of tubes such as for example fuel hoses, extrusion of films and injection molded articles.

The invention is further illustrated with reference to the following examples without however the intention to limit the invention thereto.

EXAMPLES

Methods

The melt flow index (MFI), reported in g/10 min, was measured according to ASTM D-1238 at a support weight of 5.0 kg. Unless otherwise noted, a temperature of 265° C. was applied and a standardized extrusion die of 2.1 mm diameter and a length of 8.0 mm was used.

Melting peaks of the fluororesins were determined according to ASTM 4591 by means of Perkin-Elmer DSC 7.0 (PerkinElmer, Wellesley, Mass.) under nitrogen flow and a heating rate of 10° C./min. The indicated melting points relate to the melting peak maximum.

The latex particle size determination was conducted by means of dynamic light scattering with a Malvern Zetazizer 1000 HSA (Malvern Instruments Inc., Southborough, Mass.) in accordance to ISO/DIS 13321. The reported average particle size is the Z-average. Prior to the measurements, the polymer latexes as yielded from the polymerizations were diluted with 0.001 mol/L KCl-solution, the measurement temperature was 20° C. in all cases.

Solution viscosities of diluted polymer solutions were determined usually on a 0.16% polymer solution in methylethylketone (MEK) at 35° C. in accordance to DIN 53726. A Connon-Fenske-Routine-Viskosimeter (Fa. Schott, Mainz/Germany) fulfilling ISO/DIS 3105 and ASTM D 2515 was used for the measurements. The Hagenbach correcture was applied as usual. The so-obtained reduced viscosities $\eta_{red.}$ were converted into the intrinsic viscosity $[\eta]$ using the Huggins equation ($\eta_{red.}=[\eta]+k_H\times[\eta]^2\times c$) and a Huggins constant of $k_H=0.34$.

Oscillatory shear flow measurements were conducted on fluoropolymer melts using a strain controlled ARES rheometer (3ARES-13; Firmware version 4.04.00) of TA Instruments New Castle, Del., USA) equipped with a FRT 200 transducer with a force range of up to 200 g. Dynamic mechanical data were recorded at 265° C. in nitrogen atmosphere in frequency sweep experiments using a 25 mm parallel plate geometry. The thermal control of the oven was operated using the sample/tool thermal element. A strain typically ascending from 1 to 20% was applied. Zero shear viscosities $\eta_0$, reported in Pa×s, were extrapolated from the viscosity function $\eta^*(\omega)$ using the 4 parameter Carreau fit function provided by the orchestrator software (version 7.0.8.13). Using the so-obtained zero shear viscosities $\eta_0$ and the intrinsic viscosity $[\eta]$ (see above), the long chain branching index LCBI was evaluated according to equation 1 and the constants of a=5.26 and k=2.47×10$^{-7}$. The phase angle at gel point $\delta_c$, needed to evaluate the relaxation exponent n (n=$\delta_c$/90°), is selected from the frequency where the 1$^{st}$ derivative of $\delta(\omega)$ passes the maximum or the 2$^{nd}$ derivative passes zero. Transient elongational viscosity functions in shear $\eta_0^+(t)$, needed to evaluate the quantity of strain hardening (see below), were calculated from the frequency sweep. Herein, the elongational viscosity was obtained by multiplying the viscosity $\eta^*$ by factor of 3 (according to the Trouton rule) and the time t was obtained from the inverse frequency (t=1/$\omega$).

Transient uniaxial extensional measurements at 265° C. were recorded in the same ARES rheometer using the ARES-EVF (Elongation Viscosity Fixture) tool of TA Instruments (two rollers have a distance of 12.7 mm). The thermal control of the oven was operated in "Mode 3" using the thermal element in the oven. The polymer samples analyzed were taken from a press-sintered plate and had a rectangular geometry with the dimensions of usually 18 mm length, 9 to 11 mm height and 0.7 to 1.0 mm thickness. A preheat time of 100 s and an initial tension of 0.01 l/s were applied. The thermal expansion was compensated using a polymer density at room temperature of 1.8 g/cm$^3$ and a polymer density at 265° C. of 1.5 g/cm$^3$. The elongational viscosity as a function of time $\eta_E^-(t)$ was recorded at strain rates $\epsilon_0^*$ of 0.3, 1.0, 3.0 and 10 s$^{-1}$ with the motor setting in strain controlled, continuous and transient mode. Although a Hencky (true) strain of maximum 4.9 (L/L$_0$=134) is achievable with the ARES-EVF device, a Hencky strain of 2.5 (L/L$_0$=2.2) is practically attainable. Unless otherwise noted, no cone break occurred during the measurement under these conditions.

The dimensionless strain hardening coefficient S was determined according to: $S=\eta_E^+(t,\epsilon_0^*)/[3\times\eta_0^+(t)]$. Herein, $\eta_E^+(t,\epsilon_0^*)$ is the elongational viscosity taken at a Hencky strain of 2.2 (L/L$_0$=9.0) or 1.5 (L/L$_0$=4.5), alternatively and $\eta_0^+(t)$ is the transient elongational viscosity functions in shear calculated from the frequency sweep experiment.

In order to record the strain hardening with a spinning apparatus, the following experimental setup was chosen. Melt strands were extruded using a Rheograph 2000 capillary rheometer (Goettfert, Buchen, Germany). A standard capillary of 2.3 mm diameter and 36 mm length and a standard 500 bar pressure transducer were chosen. Unless otherwise noted, the melt temperature was 265° C. A piston speed of 0.5 mm/s was applied, which corresponds to an apparent shear rate of 47.3 1/s. The so extruded melt strand was taken by the rolls of the Rheotens 101.1 from Goettfert (Buchen, Germany) so that the spinning length was 80 mm. The speed ramp chosen for the spinning experiment was 12 mm/s$^2$. The maximum roller force $F_{max.}$, reported in units of cN, was taken when a constant plateau value of the Rheotens force curve was reached. The pressure needed to evaluate $F_{max.}/p$ was taken from the transducer of the capillary rheometer.

Example 1

A terpolymer of 39 mole % TFE, 11 mole % HFP and 50 mole % VDF with a straight linear chain topography was prepared in a polymerization kettle with a total volume of 48.5 l equipped with an impeller agitator system according to the following procedure. The kettle was charged with 29.0 l deionized water; 2 g oxalic acid, 12 g ammonium oxalate and 252 g of a 30 weight % aqueous solution of perfluorooctanoate ammonium salt (APFO). The oxygen free kettle was then heated up to 40° C. and the agitation system was set to 240 rpm. The kettle was charged with ethane to a pressure of 1.2 bar absolute, 953 g hexafluoropropylene (HFP) to a pressure of 7.5 bar absolute, with 283 g vinylidenefluoride (VDF) to 11.7 bar absolute and with 429 g tetrafluorethylene (TFE) to 15.5 bar absolute reaction pressure. The polymerization was initiated by the addition of 10 ml 1.0% aqueous potassium permanganate (KMnO$_4$) solution and a continuous feed of KMnO$_4$-solution was maintained with a feed rate of 120 ml/h. After the reaction started, the reaction temperature of 40° C. and the reaction pressure of 15.5 bar absolute was maintained by feeding TFE, VDF and HFP into the gas phase with a HFP (kg)/TFE (kg) feeding ratio of 0.423 and a VDF (kg)/TFE (kg) feeding ratio of 0.820. After 20 min and 450 g of TFE was fed, the monomer feeding system was limited to a TFE flow of 2.15 kg/h. The feeding ratio of the other monomers was maintained. Due to the limitation of the monomer flow, the reaction pressure dropped to 9.8 bar absolute. When a total feed of 6590 g TFE was reached within 190 min and the reaction pressure increased to 10.1 bar, the monomer feed was interrupted by closing the monomer valves. Within 10 minutes, the monomer gas phase was reacted down to a kettle pressure of 9.2 bar. Then the reactor was vented and flushed with N$_2$ in three cycles.

The thus obtained 44.2 kg polymer dispersion having a solid content of 35.4% and average latex particle diameter of 97 nm (as determined by dynamic light scattering) was removed at the bottom of the reactor, passed through a glass column containing DOWEX 650C cation exchange resin (Dow Chemical Co, Midland, Mich.) and 8.8 l of the dispersion was transferred into a 20-l agglomeration vessel. To the polymer dispersion was added 5 l deionized water, 0.12 l concentrated hydrochloric acid and 1.8 l perfluoro n-heptane PF 5070 agglomeration aid (3M Company, St. Paul, Minn.). The agglomeration kettle was agitated vigorously until the solid had fully separated from the aqueous phase. The agglomerate was washed three times with deionized water, the agglomeration aid was distilled off and the polymer was dried in an oven at 80° C. for 12 hours. The thus obtained 2.9 kg polymer is readily soluble in methylethylketone (MEK) and tetrahydrofuran (THF) and showed the physical characteristics listed below:

| | |
|---|---|
| Melting point maximum | 112° C. |
| MFI (265/5) | 14.0 g/10 min |
| Zero shear viscosity at 265° C. | $3.1 \times 10^3$ Pa * s |
| Reduced viscosity (MEK @ 35° C.) | 81.5 ml/g |
| Intrinsic viscosity (MEK @ 35° C.) | 78 ml/g |
| LCBI (as calculated) | $6 \times 10^{-2}$ |
| Relaxation exponent n | 1.0 |
| $F_{max}/p$ | 0.045 cN/bar |

Example 2

A high molecular weight fluoropolymer with straight linear chain topography was prepared in similarly to example 1 with the only difference being that 0.2 bar ethane was pressurized and a 0.5% aqueous potassium permanganate (KMnO4) solution was used. The other polymerization conditions and the polymer work up was the same. The thus obtained polymer showed the physical characteristics listed below:

| | |
|---|---|
| Melting point maximum | 105° C. |
| MFI (265/5) | 0.03 g/10 min |
| Zero shear viscosity at 265° C. | $3 \times 10^6$ Pa * s |
| Reduced viscosity (MEK @ 35° C.) | 360 ml/g |
| Intrinsic viscosity (MEK @ 35° C.) | 309 ml/g |
| LCBI (as calculated) | $4 \times 10^{-3}$ |
| Relaxation exponent n | 1.0 |

Examples 3-6

Various blends were prepared from the polymer dispersions of example 1 and example 2. The high molecular weight portion (example 2) varied from 2% to 20% by weight with respect to solid polymer. These dispersion blends were worked up similarly to example 1. The thus obtained polymer blends of linear chain architecture had a molecular weight distribution with a distinct tailing at high molecular weights (affected by the polymer of example 2). These polymers were analyzed by means of oscillatory and elongational rheometry. The results are summarized in Table 1. In the range of elongational rates applied, none of the examples shows a discernible strain hardening.

TABLE 1

| | Example 3 | Example 4 | Example 5 | Example 6 |
|---|---|---|---|---|
| Content of Example 2 (by weight) | 2% | 5% | 10% | 20% |
| MFI (265/5) [g/10 min] | 11.6 | 8.7 | 5.2 | 1.8 |
| $\eta_{0,265° C.}$ [Pa-s] | $5.0 \times 10^3$ | $1.1 \times 10^4$ | $3.6 \times 10^4$ | $1.7 \times 10^5$ |
| $S^1$ ($\dot{\epsilon_0} = 0.3\ s^{-1}$) | 1.11 | 1.07 | 1.14 | 0.98 |
| $S^1$ ($\dot{\epsilon_0} = 1\ s^{-1}$) | 1.11 | 1.11 | 1.09 | 0.97 |
| $S^1$ ($\dot{\epsilon_0} = 3\ s^{-1}$) | — | 1.06 | 1.18 | 1.11 |

[1]determined at a Hencky strain of 1.5

Example 7

In the following example, a copolymer with a chemical composition similar to example 1, but with a long chain branched chain architecture was produced. The polymerization was conducted in the same kettle as example 1 and similar procedures were applied except for the following changes. The kettle was charged at 60° C. with ethane to a pressure of 2.2 bar absolute and 906 g hexafluoropropylene (HFP) to a pressure of 8.9 bar absolute. The stainless steel cylinder used as a feeding line for HFP (total volume 5.3 l) was fully evacuated. After complete evacuation, the cylinder was charged with 1600 mbar of bromodifluoroethylene (BDFE, 50 g). Then the cylinder was rapidly charged with 2850 g HFP in order to ensure a sufficient dispersion of BDFE into HFP under turbulent flow conditions. The rest of the polymerization was conducted at 60° C. polymerization temperature in the same manner as described in example 1. A 1.0% aqueous potassium permanganate (KMnO4) solution was used and a feed rate of 75 ml/h was applied. The polymerization took 230 min to obtain a polymer dispersion having a solid content of 34.0% by weight and latex particles having an average diameter of 98 nm (determined by dynamic light scattering). The physical characteristics of the polymer (worked up in the same manner as described in example 1) are listed below:

| | |
|---|---|
| Melting point maximum | 116° C. |
| MFI (265/5) | 17.0 g/10 min |
| Zero shear viscosity at 265° C. | $8.4 \times 10^3$ Pa * s |
| Reduced viscosity (MEK @ 35° C.) | 61 ml/g |
| Intrinsic viscosity (MEK @ 35° C.) | 59 ml/g |
| LCBI | 0.70 |
| Phase angle | 43° |
| Relaxation exponent | 0.48 |
| S ($\dot{\epsilon_0} = 0.3\ s^{-1}$) | 1.84 |
| S ($\dot{\epsilon_0} = 1.0\ s^{-1}$) | 2.15 |
| S ($\dot{\epsilon_0} = 3.0\ s^{-1}$) | 2.07 |
| S ($\dot{\epsilon_0} = 10\ s^{-1}$) | 2.39 |
| $F_{max}/p$ | 0.163 cN/bar |

Example 8

A blend of a long chain branched fluoropolymer and a linear polymer and its properties is described in this example. A polymer blend consisting of 50% by weight from example 7 and 50% by weight from example 1 was prepared as in example 3. The MFI of both blend components is very similar. The physical characteristics of this polymer are listed below:

| | |
|---|---|
| MFI (265/5) | 13.6 g/10 min |
| Zero shear viscosity at 265° C. | $6.4 \times 10^3$ Pa * s |

-continued

| | |
|---|---|
| S ($\dot{\epsilon}_0$ = 3.0 s$^{-1}$) | 1.53 |
| S ($\dot{\epsilon}_0$ = 1.0 s$^{-1}$) | 1.78 |
| S ($\dot{\epsilon}_0$ = 3.0 s$^{-1}$) | 1.93 |
| S ($\dot{\epsilon}_0$ = 10 s$^{-1}$) | 2.12 |

The elongational viscosity data show that the strain hardening behavior of the polymer from example 7 is almost completely maintained, although it is diluted 1:1 with a linear polymer.

Example 9

A high molecular weight copolymer with a chemical composition similar to example 2, but with a long chain branched chain architecture was produced. The polymerization was conducted in the same kettle as example 2 and similar procedures were applied except for the following changes: 1.05 bar ethane was pressurized and a 12.5 g BDFE (410 mbar BDFE) was charged into the HFP cylinder. The other polymerization conditions (the monomer feed was completed after 190 min) and the polymer work up was the same.

| | |
|---|---|
| Melting point maximum | 112° C. |
| MFI(265/5) | 0.82 g/10 min |
| Zero shear viscosity at 265° C. | 1.6 × 10$^6$ Pa * s |
| Reduced viscosity (MEK @ 35° C.) | 107.5 ml/g |
| Intrinsic viscosity (MEK @ 35° C.) | 102 ml/g |
| LCBI | 1.67 |
| Relaxation exponent n | 0.43 |

In analogy to example 7, the physical parameters LCBI and relaxation exponent n clearly reveal the long chain branched architecture of this polymer example.

Example 10

A blend of a high molecular weight fluoropolymer with a long chain branched architecture and a linear polymer is described in the following example. A polymer blend consisting of 10% by weight of example 9 and of 90% by weight of example 1 was prepared as in example 3. The MFI of both blend components differ from each other by factor of 17. The physical characteristics of this polymer blend are listed below:

| | |
|---|---|
| MFI (265/5) | 11.1 g/10 min |
| Zero shear viscosity at 265° C. | 6.0 × 10$^3$ Pa * s |
| S ($\dot{\epsilon}_0$ = 0.3 s$^{-1}$) | 1.14 |
| S ($\dot{\epsilon}_0$ = 1.0 s$^{-1}$) | 1.30 |
| S ($\dot{\epsilon}_0$ = 3.0 s$^{-1}$) | 1.38 |
| S ($\dot{\epsilon}_0$ = 10 s$^{-1}$) | 1.69 |
| F$_{max}$/p | 0.078 cN/bar |

The inclusion of 10% of the polymer of example 9 into a matrix of a linear polymer chains is enough to induce a marked strain hardening of the polymer blend. It would not be expected from a person skilled in the art that the combination of a linear polymer (not strain hardening; example 3-6) and the polymer of example 9 (also not strain hardening) shows this pronounced effect.

What is claimed is:

1. A melt-processable fluoropolymer composition comprising a fluoropolymer with a core-shell structure, the fluoropolymer having from 50 to 95% by weight based on the total weight of the composition of a first fluoropolymer portion, wherein the first fluoropolymer portion has a relaxation exponent of from 0.93 to 1.0, and from 5 to 50% by weight based on the total weight of the composition of a second fluoropolymer portion, wherein the second fluoropolymer portion has a relaxation exponent of from 0.3 to 0.90, has a technological coefficient wherein the first fluoropolymer portion is melt-processable and thermoplastic end has a melting point of from 100° C to 320° C and the second fluoropolymer portion is melt-processable and thermoplastic end has a melting point of from 112° C to 320° C, further wherein the relative amount of each of the same monomeric unit in the first fluoroplymer portion is within 40% by weight of the relative amount of the same monomeric unit in the second fluoropolymer portion, further wherein the composition has a strain hardening coefficient S of from 1.2 to 1.78, measured at an elongational rate of 1 1/s, further wherein the first fluoropolymer portion is selected from the group consisting of a copolymer of tetrafluoroethylene and hexafluoropropylene, a copolymer of tetrafluoroethylene and perfluorovinyl ether, a copolymer of vinylidene fluoride and hexafluoropropylene, a copolymer of tetrafluoroethylene and vinylidene fluoride, a copolymer of chlorotrifluoroethylene and vinylidens fluoride, a copolymer of vinylidene fluoride and perfluorovinyl, a terpolymer of tetrafluoroethylene, hexafluoropropylene and perfluorovinyl ether, a terpolymer of tetrafluoroethylene, vinylidene fluoride and hexafluoropropylene, and a terpolymer of vinylidene fluoride, tetrafluoroethylene and perfluorovinyl ether and wherein the second fluoropolymer portion is derived from the group consisting of (a) one or more gaseous fluorinated monomers, and (b) one or more modifiers selected from the group consisting of (i) olefins having a bromine or iodine atom bonded to a carbon of the double bond of the olefin, (ii) olefins corresponding to formula (I);

$$Z_2C=CZ—R_f—Br \quad (I)$$

wherein each Z independently represents hydrogen, fluoride, bromine, chlorine or iodine, R$_f$ is a perfluoroalkylene group, a perfluorooxyalkylene group or a perfluoropolyther group; (iii) olefins corresponding to the formula CH$_2$=CH —R$_f$— CH=CH$_2$, wherein R$_f$ is selected from the group consisting of a divalent perfluoroaliphatic group, originally containing one or more O atoms, a perfluoroaroarylene group, and a perfluoroalkarylene group; and (iv) mixtures thereof.

2. The composition according to claim 1 wherein the relaxation exponent of the second fluoropolymer portion is from 0.3 to 0.85.

3. A method for making a melt-processable fluoropolymer composition comprising a fluoropolymer with a core-shell structure, the fluoropolymer having a first fluoropolymer portion and a second fluoropolymer portion, wherein the method has a melting point of from 100° C. to 320° C., comprises:
    polymerizing to form the first fluoropolymer portion having a relaxation exponent of from 0.93 to 1.0; and
    polymerizing to form the second fluoropolymer portion having a relaxation exponent of from 0.3 to 0.90;
    wherein one of the polymerizing of the first fluoropolymer portion or second fluoropolymer portion takes place in the presence of the other, wherein the first fluoropolymer portion is melt-processable and thermoplastic and has melting point of from 100° C to 320° C and the second fluoropolymer portion is melt-processable and thermoplastic and has a melting point of from 112° C to 320° C, and wherein the first fluoropolymer portion is present in an amount of from 50 to 95% by weight based on the total weight of the composition and the second fluoropolymer portion is present in the amount of from 5 to 50% by weight based on the total weight of the composition, further wherein the relative amount of each monomeric unit in the first fluoropolymer portion is within 40% by weight of the relative amount of the same monomeric unit in the second fluoropolymer portion, further wherein the composition has a strain hardening coefficient S of from 1.2 to 1.78, measured at an elongational rate of 1 1/s, further wherein the first fluoropolymer portion is selected from the group consisting of a copolymer of tetrafluoroethylene and hexafluoropropylene, a copolymer of tetrafluoroethylene and perfluorovinyl ether, a copolymer of vinylidene fluoride and hexafluoropropylene, a copolymer of tetrafluoroethylene and vinylidene fluoride, a copolymer of chlorotrifluoroethylene and vinylidene fluoride, a copolymer of vinylidene fluoride and perfluorovinyl ether, a terpolymer of tetrafluoroethylene, hexafluoropropylene and perfluorovinyl ether, a terpolymer of tetrafluoroethylene, vinylidene fluoride and hexafluoropropylene, and a terpolymer of vinylidene fluoride, tetrafluoroethylene and perfluorovinyl ether and wherein the second fluoropolymer portion is derived from the group consisting of (a) one or more gaseous fluorinated monomers, and (b) one or more modifiers selected from the group consisting of (i) olefins having a bromine or iodine atom bonded to a carbon of the double bond of the olefin, (ii) olefins corresponding to formula (I);

$$Z_2C=CZ-R_f-Br \tag{I}$$

wherein each Z independently represents hydrogen, fluorine, bromine, chlorine or iodine, $R_f$ is a perfluoroalkylene group, a perfluorooxyalkylene group or a perfluoropolyether group; (iii) olefins corresponding to the formula $CH_2=CH-R_f-CH=CH_2$, wherein $R_f$ is selected from the group consisting of a divalent perfluoroaliphatic group, optionally containing one or more O atoms, a perfluoroarylene group, and a perfluoroalkarylene group; and (iv) mixtures thereof.

4. The method according to claim 3 wherein the second fluoropolymer portion and the first fluoropolymer portion are perfluoroinated and wherein subsequent to polymerizing and further polymerizing, the resulting first and second fluoropolymer portions are subjected to fluorination.

\* \* \* \* \*

UNITED STATES PATENT AND TRADEMARK OFFICE
CERTIFICATE OF CORRECTION

PATENT NO. : 9,029,477 B2  
APPLICATION NO. : 11/276520  
DATED : May 12, 2015  
INVENTOR(S) : Kaspar Page 1 of 1

It is certified that error appears in the above-identified patent and that said Letters Patent is hereby corrected as shown below:

In the specification

Column 8
Line 36, Delete "COO— or $SO_3$—" and insert -- $COO^-$ or $SO_3^-$ --, therefor.

Column 12
Line 24, Delete "Brabury" and insert -- Banbury --, therefor.

Column 13
Line 15, Delete "Zetazizer" and insert -- Zetasizer --, therefor.
Line 25, Delete "Connon-" and insert -- Cannon- --, therefor.
Line 25, Delete "Viskosimeter" and insert -- Viscometer- --, therefor.

Column 14
Line 4, Delete "$\eta_E^-(t)$" and insert -- $\eta_E^+(t)$ --, therefor.
Line 48, Delete "tetrafluorethylene" and insert -- tetrafluoroethylene --, therefor.

Column 15
Line 38, Delete "(KMnO4)" and insert -- $(KMnO_4)$ --, therefor.

Column 16
Line 33, Delete "(KMnO4)" and insert -- $(KMnO_4)$ --, therefor.

\*

Signed and Sealed this  
Fifth Day of January, 2016

Michelle K. Lee  
*Director of the United States Patent and Trademark Office*